(12) United States Patent
Vaidyanathan et al.

(10) Patent No.: US 7,359,834 B2
(45) Date of Patent: Apr. 15, 2008

(54) MONITORING SYSTEM-CALLS TO IDENTIFY RUNAWAY PROCESSES WITHIN A COMPUTER SYSTEM

(75) Inventors: Kalyanaraman Vaidyanathan, San Diego, CA (US); Sajjit Thampy, Sunnyvale, CA (US); Kenneth C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/388,405

(22) Filed: Mar. 24, 2006

(65) Prior Publication Data

US 2006/0184669 A1 Aug. 17, 2006

Related U.S. Application Data

(63) Continuation-in-part of application No. 10/918,128, filed on Aug. 13, 2004.

(51) Int. Cl.
*G06F 11/30* (2006.01)

(52) U.S. Cl. ..................................... 702/186; 702/182
(58) Field of Classification Search ..................... None
See application file for complete search history.

(56) References Cited

U.S. PATENT DOCUMENTS 4,937,763 A 6/1990 Mott .......................... 702/183

FOREIGN PATENT DOCUMENTS

| JP | 01048138 A | * | 2/1989 |
| JP | 02300944 A | * | 12/1990 |
| JP | 10289128 A | * | 10/1998 |
| JP | 2000357110 A | * | 12/2000 |

* cited by examiner

*Primary Examiner*—Manuel L. Barbee
(74) *Attorney, Agent, or Firm*—Park, Vaughan & Fleming, LLP

(57) ABSTRACT

One embodiment of the present invention provides a system that monitors system-calls to identify runaway processes within a computer system. First, the system monitors system-calls on the computer system during runtime, to generate a trace of system-calls made. Then, the system analyzes the trace to detect runaway processes.

15 Claims, 3 Drawing Sheets

MONITORING SYSTEM-CALLS TO IDENTIFY RUNAWAY PROCESSES WITHIN A COMPUTER SYSTEM

RELATED APPLICATION

This application is a continuation-in-part of pending U.S. patent application Ser. No. 10/918,128 filed on 13 Aug. 2004 by inventors Aleksey M. Urmanov, Anton A. Bougaev, Kalyanaraman Vaidyanathan, and Kenny C. Gross, entitled "Method and Apparatus for Identifying Runaway Processes in Computer Systems". This application hereby claims priority under 35 U.S.C. §120 to the above-listed parent patent application.

BACKGROUND

1. Field of the Invention

The present invention relates to techniques for improving the performance of computer systems. More specifically, the present invention relates to a method and an apparatus for proactively identifying runaway processes in computer systems.

2. Related Art

System administrators for enterprise-wide computer systems typically handle dozens (or even hundreds) of heterogeneous computer systems that service thousands of end users. Hence, a system administrator usually deals with an extremely large volume of system information, making it almost impossible for the administrator to manually detect precursors for system performance degradation. Consequently, problems in an enterprise computer system are typically detected only after they have already caused a significant amount of performance degradation.

One of the main causes of performance degradation are runaway processes. A runaway process is a process that no longer provides service to the user who initiated it, but continues to use system resources. For example, a runaway process can be caused by an application which crashes or is not properly terminated. In such situations, the user often has no knowledge of the continued existence of the runaway process, and the runaway process ends up using resources until someone manually identifies and terminates it or the machine is rebooted.

Runaway processes can cause dramatic performance degradation in enterprise computer systems. Even runaway processes which are not large enough to completely shut down a server can cause significant problems, particularly when there are multiple runaway processes running on a single server. For example, a small runaway process using 5% of the server's resources only marginally affects the operation of the server. However, five instances of these small runaway processes can consume 25% of the server's resources, which can seriously degrade the performance of the server.

Runaway processes are often hard to detect because superficially, their appearance is indistinguishable from a normal process. Hence, a system administrator typically needs to spend a considerable amount of time to carefully examine several process parameters before concluding that a process is a runaway process. Unfortunately, system administrators are usually hard-pressed for time. As a result, runaway processes typically run unimpeded, until they create serious performance problems.

Hence, what is needed is an accurate runaway-process-detection mechanism to assist system administrators in identifying runaway processes before they significantly degrade system performance.

SUMMARY

One embodiment of the present invention provides a system that monitors system-calls to identify runaway processes within a computer system. First, the system monitors system-calls on the computer system during runtime, to generate a trace of system-calls made. Then, the system analyzes the trace to detect runaway processes.

In a variation on this embodiment, the system analyzes the trace of system-calls made by computing a metric from the trace and then using the metric to subsequently identify runaway processes.

In further variation, the system computes the metric by creating a histogram for the trace of system-calls made. Next, the system compares the frequency of the most common system-call in the trace to the mean system-call frequency for the system-calls in the trace.

In a further variation, the system performs the method over a limited time interval, in order to reduce resource usage.

In a further variation, the system repeatedly monitors and analyzes the trace of system-calls made, in order to determine changes in the metric.

In a variation on this embodiment, the system monitors system-calls on the computer system using a dynamic tracing framework.

In a further variation, the system identifies a runaway process by checking a set of secondary characteristics to confirm that a process is likely to be a runaway process. This check can involve comparing a process type for a process to a list of culprit process types to determine whether the process is likely to be a runaway process.

In a further variation, after detecting a potential runaway process, the system responds by: (1) killing the runaway process; (2) alerting a system administrator of the runaway process; and/or (3) alerting an owner of the runaway process.

DETAILED DESCRIPTION

Figure 1:
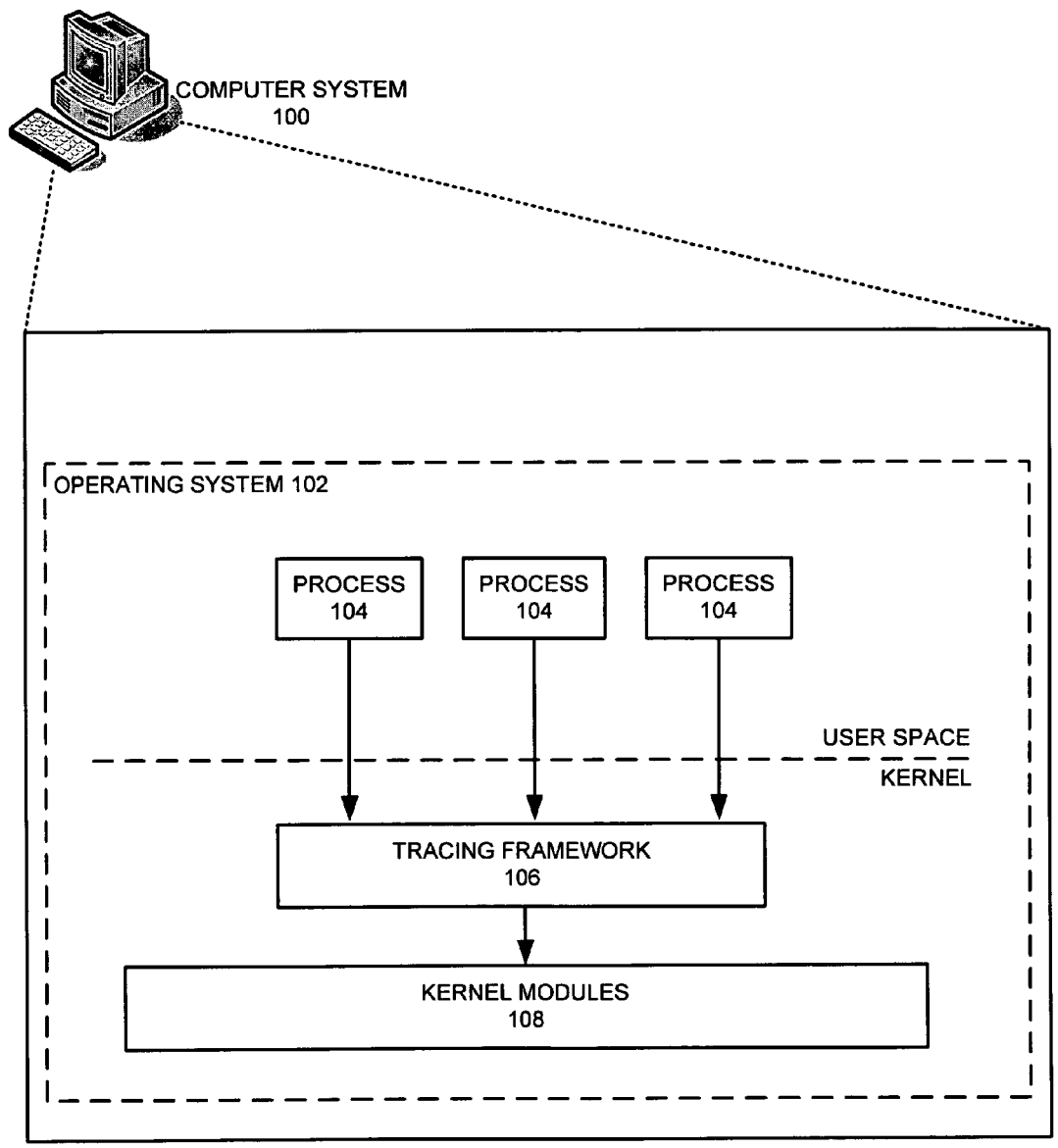
FIG. 1 illustrates an example of processes making system-calls through a tracing framework in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Runaway Processes

In computer systems, it is quite common for one process (a parent) to spawn off a second process (a child). Usually, the child completes its task and then exits gracefully, possibly passing a result back to the parent. Sometimes, however, the child process does not exit due to bugs in the program. When this happens, the parent may die or be killed, but leave the child process running. At this point, the child process is a "runaway" process. A runaway process which is stuck in an infinite loop may continue to consume system resources while no longer providing service to the user, and with no other process left to tell the runaway process to stop.

Runaway processes typically eat up shared computer resources until system administrators or the owners of the processes kill them. A system with a large number of runaway processes will quickly become unusable. Unfortunately, in many cases, systems affected by such runaway processes are often shared by hundreds of other users. As a result, this problem can potentially disrupt a significant number of users of an enterprise computer system.

System administrators typically identify and clean-up runaway processes manually. This manual effort requires a great deal of attention and detailed system knowledge, since deciding whether a process is a runaway can be difficult. While automated scripts can watch the amount of CPU time consumed by a process and apply a threshold to determine if that process is a runway, such techniques often cannot distinguish between runaway processes and legitimate CPU-intensive processes. False alarms and missed alarms generated by these techniques can greatly inconvenience users on the system.

One embodiment of the present invention provides a reliable, automated detection technique that assists human system administrators in identifying runaway processes and in taking appropriate actions, thereby providing a way to identify runaway processes early and to thereby improve the performance of computer systems.

Monitoring System-Calls

The present invention detects runaway process by monitoring the system-calls made by processes, building a histogram of system-calls made for each process, and then analyzing the histograms to detect runaway processes. Any working process typically has a set of system-calls that it invokes to get work done. The frequency distribution of these system-calls is typically quite dynamic for normal processes, and changes based on the current actions of the process. In contrast, the distribution of system-calls for runaway processes typically remains static over time. Often, histograms for runaway processes show that a single system-call dominates, indicating that the process continually invokes a particular system-call (for example, wait or read) that causes the process to consume CPU cycles.

The above observations allow the system to characterize runaway processes by determining if: (1) the histograms of system-calls are constant across different timeframes; and (2) the histogram of system-calls becomes skewed. By occasionally monitoring system-calls to check for skewed or static system-call distributions, the system can systematically and quantitatively monitor a large number of processes. Lightweight monitoring based on this technique can support automated real-time detection of runaway processes.

FIG. 1 illustrates an example of processes 104 making system-calls through a tracing framework 106 within the operating system 102 of a computer system 100. The tracing framework 106 records data of interest before passing requests on to the appropriate kernel modules 108.

Figure 2A:
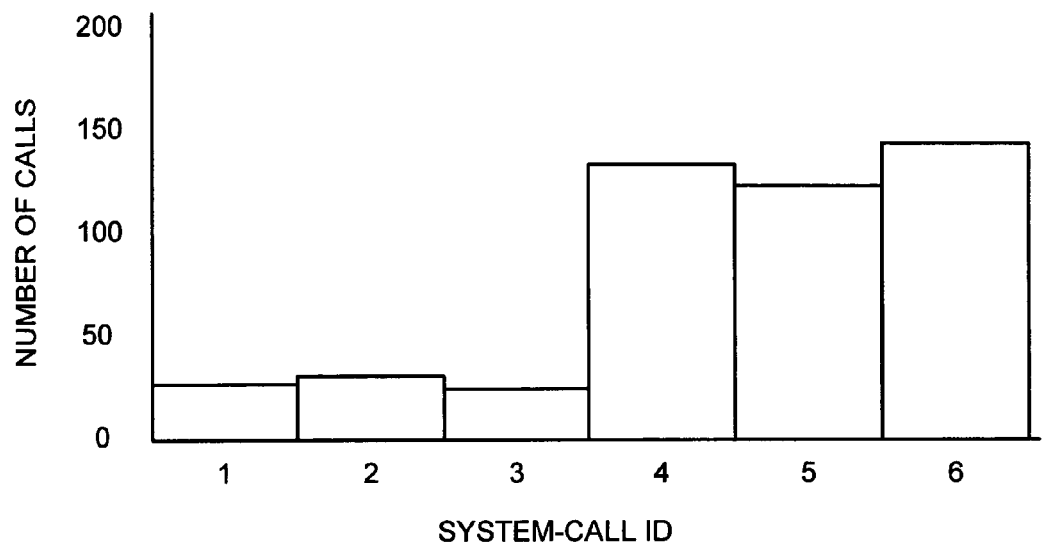
FIG. 2A illustrates an example of a dynamic frequency distribution for system-calls in a normal process in accordance with an embodiment of the present invention.
Figure 2B:
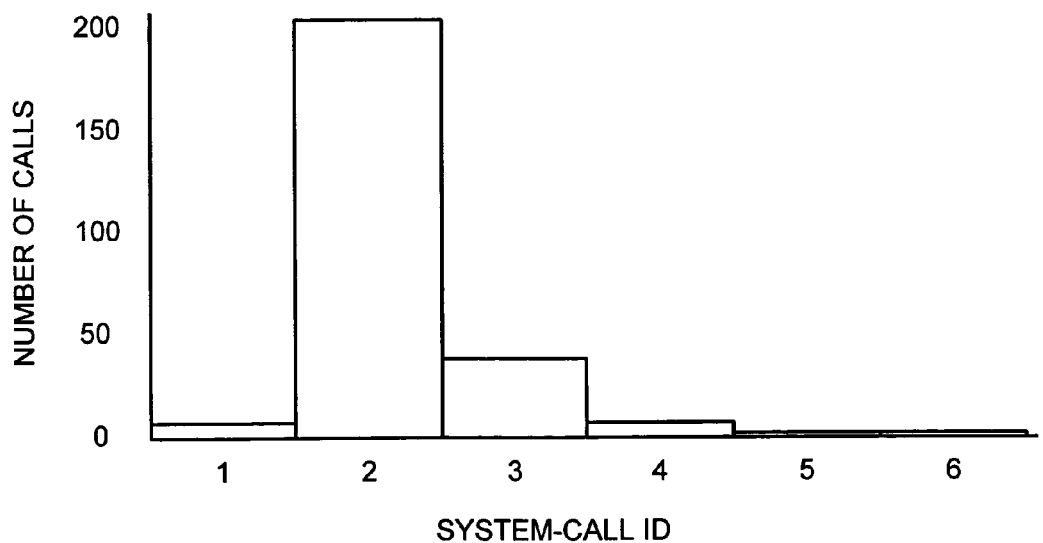
FIG. 2B illustrates a system-call distribution for a runaway process in which a single system-call dominates in accordance with an embodiment of the present invention.

FIG. 2A illustrates an example of a dynamic frequency distribution for system-calls in a normal process. In FIG. 2A, a process makes a variety of system-calls in a given time interval. FIG. 2B, on the other hand, illustrates a system-call distribution for a runaway process in which a single system-call dominates. If the system finds that such a distribution remains static for a process across multiple time intervals, it can flag the process as a runaway process.

Figure 3:
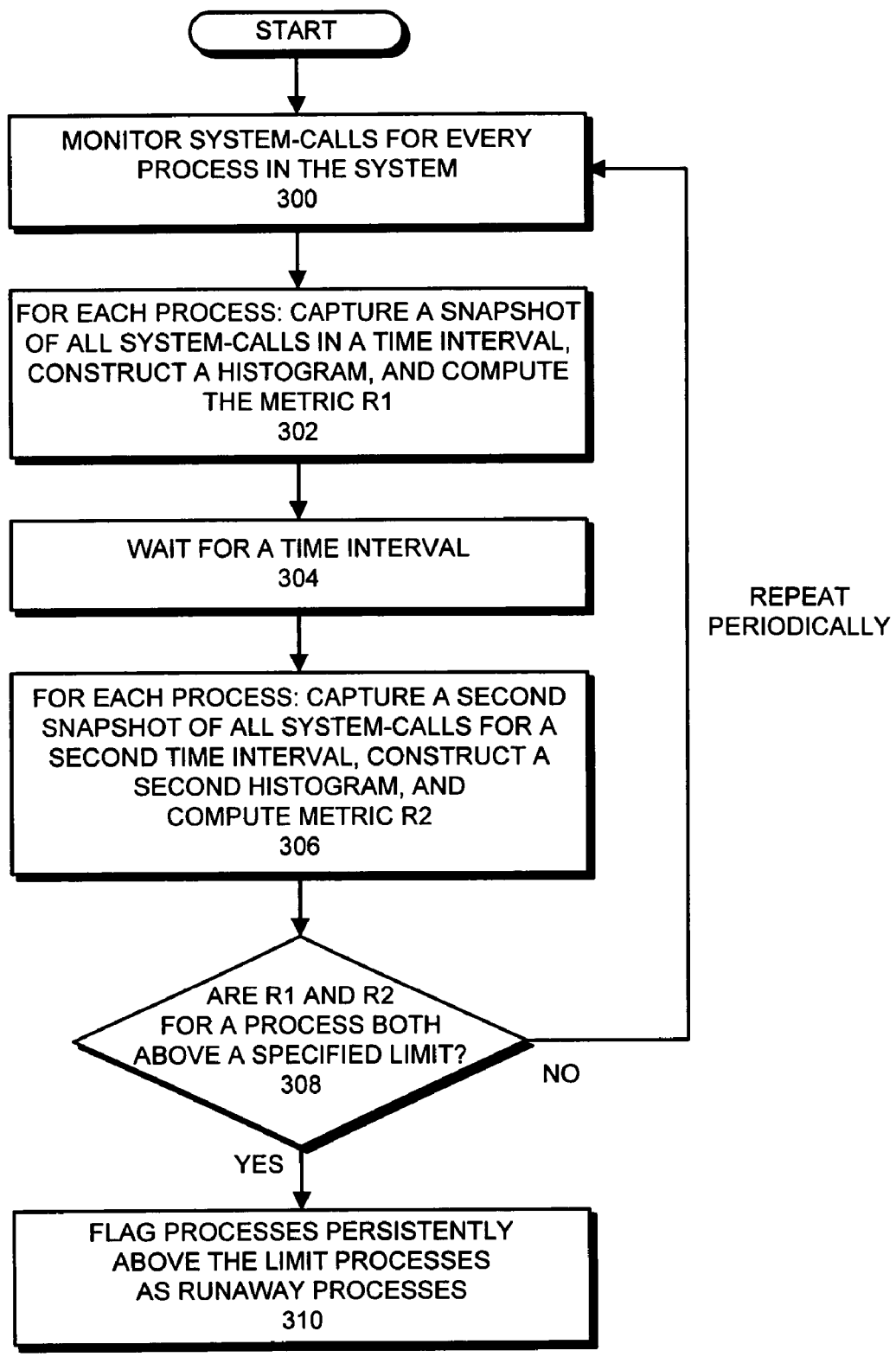
FIG. 3 presents a flow chart illustrating the process of monitoring system-calls to find runaway processes in accordance with an embodiment of the present invention.

FIG. 3 presents a flow chart illustrating the process of monitoring system-calls to find runaway processes. First, the system monitors the system-calls for every process in the system for a time interval (step 300). In one embodiment of the present invention, the system traces system-calls using a dynamic tracing framework such as dtrace (in Solaris 10 and above), strace (in UNIX), or truss (in Solaris).

Next, the system applies intelligent rules based on the distribution of system-calls to determine if the process is a runaway. First, the system uses the snapshot of all system-calls invoked for each process in the time interval to construct a per-process histogram (step 302). Next, the system uses this histogram to compute a metric R1 for each histogram. In one embodiment of the present invention, the system computes R1 as the ratio of the highest frequency system-call in the histogram to the mean system-call frequency in the histogram. This value serves as an estimate of the "kurtosis", or "peakedness," of the histogram; a high-kurtosis distribution has a sharper "peak" (e.g. a single dominant system-call), while a low-kurtosis distribution has a more rounded peak with wider "shoulders." The metric R1 is substantially different for normal processes and runaway processes.

Note that in the above-described embodiment, the system does not need to maintain the same order of system-call types across all histograms, as long as the system tallies the system-calls of each type correctly. By computing the ratio of the highest frequency system-call in the histogram to the mean system-call frequency in the histogram, the system ensures that the metric does not change for a given data set if the order of system-call types changes in the histogram.

After computing the metric for the snapshot time interval, the system waits another time interval (step 304), and then proceeds to gather another snapshot of the system-calls made on the server for a second time interval. The system constructs from this second snapshot a second set of histograms, and computes metrics R2 for those histograms (step 306). After gathering the second set of metrics, the system proceeds to determine for each process whether the values of R1 and R2 are above a specified limit (step 308).

In one embodiment of the present invention, the system compares the metrics to an empirical value derived from data collected from runaway processes. The system flags processes with persistently high metrics as runaway processes (step 310). For instance, one set of empirical data indicates that if both metrics are static and larger than the value four, the corresponding process is likely to be a runaway process.

The system repeats this monitoring and analysis periodically to ensure that runaway processes do not affect server efficiency. In one embodiment of the present invention, the system uses an interval of 5-10 seconds for the system-call snapshots, separates the two snapshots by several minutes, and repeats the check on an hourly basis. Note that the system can monitor system-call snapshots more frequently, although more frequent monitoring does result in higher overhead. However, such additional monitoring is still typically lower in overhead than techniques that require continuous monitoring or require human supervision and intervention.

The system can perform further checks on processes flagged as runaway processes before acting. In one embodiment of the present invention, the system checks a set of secondary characteristics, for instance comparing the process type of a candidate runaway process to a list of known-bad process types to determine whether the process type is known to exhibit a certain behavior. Note that the system can use supplementary methods to confirm that a process is a runaway process, as well as use the system-call monitoring method to replace or supplement existing methods for runaway identification.

Finally, the system can initiate varying degrees of response for a flagged runaway process, ranging from alerting a system administrator or the process owner to killing the process.

In summary, the present invention introduces a method for identifying runaway processes which is reliable and not compute-intensive. This allows system administrators to manage multi-user enterprise computer systems more efficiently and to avoid systems hangs, crashes and drastic performance degradation due to runaway processes.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying runaway processes within a computer system, comprising:
   monitoring system-calls on the computer system during runtime to generate a trace of system-calls made;
   analyzing the trace of system-calls made to detect runaway processes; and
   if a runaway process is detected, identifying the runaway process;
   wherein analyzing the trace of system-calls made to detect runaway processes involves:
      computing a metric from the trace of system-calls made; and
      using the metric to subsequently identify runaway processes;
   wherein computing the metric involves:
      creating a histogram for the trace of system-calls made; and
      comparing the frequency of the most common system-call in the trace to the mean system-call frequency for the system-calls in the trace.

2. The method of claim 1, wherein the method is performed over a limited time interval to reduce resource usage.

3. The method of claim 2, wherein the method is repeated over multiple time intervals to determine changes in the metric.

4. The method of claim 1, wherein monitoring system-calls on the computer system involves using a dynamic tracing framework.

5. The method of claim 1, wherein identifying a runaway process involves checking a set of secondary characteristics to confirm that a process is likely to be a runaway process.

6. The method of claim 5, wherein checking the set of secondary characteristics involves comparing a process type for the process to a list of culprit process types to determine whether the process is likely to be a runaway process.

7. The method of claim 6, wherein the method further comprises:
   killing the runaway process;
   alerting a system administrator of the runaway process; and/or
   alerting an owner of the runaway process.

8. A computer-readable storage medium storing instructions that when executed by a computer cause the computer to perform a method for identifying runaway processes within a computer system, comprising:
   monitoring system-calls on the computer system during runtime to generate a trace of system-calls made;
   analyzing the trace of system-calls made to detect runaway processes; and
   if a runaway process is detected, identifying the runaway process;
   wherein analyzing the trace of system-calls made to detect runaway processes involves:
      computing a metric from the trace of system-calls made; and
      using the metric to subsequently identify runaway processes;
   wherein computing the metric involves:
      creating a histogram for the trace of system-calls made; and
      comparing the frequency of the most common system-call in the trace to the mean system-call frequency for the system-calls in the trace.

9. The computer-readable storage medium of claim 8, wherein the method is performed over a limited time interval to reduce resource usage.

10. The computer-readable storage medium of claim 9, wherein the method is repeated over multiple time intervals to determine changes in the metric.

11. The computer-readable storage medium of claim 8, wherein monitoring system-calls on the computer system involves using a dynamic tracing framework.

12. The computer-readable storage medium of claim 8, wherein identifying a runaway process involves checking a set of secondary characteristics to confirm that a process is likely to be a runaway process.

13. The computer-readable storage medium of claim 12, wherein checking the set of secondary characteristics involves comparing a process type for the process to a list of culprit process types to determine whether the process is likely to be a runaway process.

14. The computer-readable storage medium of claim 13, wherein the method further comprises:
   killing the runaway process;
   alerting a system administrator of the runaway process; and/or
   alerting an owner of the runaway process.

15. An apparatus that identifies runaway processes within a computer system, comprising:
   a monitoring mechanism configured to monitor system-calls on the computer system during runtime to generate a trace of system-calls made;
   an analysis mechanism configured to analyze the trace of system-calls made to detect runaway processes; and an identifying mechanism configured to identify a detected runaway process;
wherein analyzing the trace of system-calls made to detect runaway processes involves:
a computation mechanism configured to compute a metric from the trace of system-calls made;
wherein the computation mechanism is further configured to compute the metric by creating a histogram for the trace of system-calls made and comparing the frequency of the most common system-call in the trace to the mean system-call frequency for the system-calls in the trace; and
an identification mechanism that is configured to use the metric to subsequently identify runaway processes.

* * * * *